United States Patent
Rothamel (10) Patent No.: US 9,295,271 B2
(45) Date of Patent: Mar. 29, 2016

(54) HEAT ACTIVATED WARM PET FOODS

(76) Inventor: Richard J. Rothamel, Wexford, PA (US)

( * ) Notice: Subject to any disclaimer, the term of this patent is extended or adjusted under 35 U.S.C. 154(b) by 0 days.

(21) Appl. No.: 13/283,955

(22) Filed: Oct. 28, 2011

(65) Prior Publication Data

US 2013/0108772 A1 May 2, 2013

(51) Int. Cl.
| | |
|---|---|
| *A23K 1/18* | (2006.01) |
| *A23K 1/10* | (2006.01) |
| *A23K 1/14* | (2006.01) |
| *A23K 1/16* | (2006.01) |
| *A23K 1/00* | (2006.01) |
| *A23L 1/168* | (2006.01) |

(52) U.S. Cl.
CPC .............. *A23K 1/186* (2013.01); *A23K 1/001* (2013.01); *A23K 1/10* (2013.01); *A23K 1/106* (2013.01); *A23K 1/14* (2013.01); *A23K 1/1643* (2013.01); *A23K 1/1853* (2013.01); *A23K 1/1866* (2013.01); *A23K 1/1846* (2013.01); *A23L 1/168* (2013.01); *A23V 2200/08* (2013.01)

(58) Field of Classification Search
CPC ........... A23K 1/10; A23K 1/106; A23K 1/14; A23K 1/1853; A23K 1/1846; A23K 1/186; A23K 1/1866; A23K 1/1612; A23K 1/002; A23L 1/0035; A23L 1/168; A23L 1/1685; A23L 1/176; A23L 1/22091
USPC ................................................. 426/623, 805
See application file for complete search history.

(56) References Cited

U.S. PATENT DOCUMENTS

| | | | | |
|---|---|---|---|---|
| 3,119,691 | A * | 1/1964 | Ludington et al. | 426/99 |
| 4,415,599 | A * | 11/1983 | Bos | 426/578 |
| 4,508,741 | A * | 4/1985 | Corbett et al. | 426/303 |
| 4,910,038 | A * | 3/1990 | Ducharme | 426/641 |
| 6,379,727 | B1 * | 4/2002 | Addy | 426/96 |
| 2006/0062884 | A1 * | 3/2006 | Benedict, III | 426/579 |
| 2006/0062892 | A1 * | 3/2006 | Merrick | 426/635 |
| 2008/0311175 | A1 * | 12/2008 | Burton et al. | 424/442 |
| 2008/0317789 | A1 * | 12/2008 | Trudso | 424/401 |
| 2009/0041910 | A1 * | 2/2009 | Rabinovitch et al. | 426/115 |

OTHER PUBLICATIONS

Aldrich, Liver: Is it delectable or disgusting?; Pet Food Industry, Apr. 2006, p. 26-27.*
Notes on oats—delicious. magazine; published on Sep. 9, 2008; available at: www.deliciousmagazine.eo.uk/stories/notes-on-oats/; accessed on May 28, 2015.*

* cited by examiner

*Primary Examiner* — Michele L Jacobson
*Assistant Examiner* — Walter Moore
(74) *Attorney, Agent, or Firm* — Ference & Associates LLC (57) ABSTRACT

An aspect provides a method of preparing a pet food product, including: placing a highly soluble aromatic composition in an upper portion of an appliance; placing a container having a composition comprising a grain based product and a dry pet food palatant in a lower portion of said appliance; mixing heated water with said highly soluble aromatic composition in said upper portion to form a heated aromatic liquid mixture; and catching said heated aromatic liquid mixture in said lower portion. Other embodiments are described.

8 Claims, 4 Drawing Sheets

HEAT ACTIVATED WARM PET FOODS

BACKGROUND

The subject matter described herein generally relates to pet food formulations, and related methods and apparatuses.

Low, high and intermediate moisture pet foods are known. Low moisture or "dry" pet foods have a stable shelf life. High moisture or "wet" pet foods are commonly deemed more palatable, and are often kept in a canned or otherwise sealed form to extend shelf life. Intermediate moisture pet foods are also known.

BRIEF SUMMARY

In summary, one aspect provides a pet food product comprising: a single packaging enclosing a dry shelf stable blend including a highly soluble aromatic composition, a grain based product, and a dry pet food palatant; wherein the dry shelf stable blend forms a slurry when mixed in the presence of a predetermined amount of heated water.

Another aspect provides a pet food product comprising: a dry shelf stable blend including a highly soluble aromatic composition that rapidly forms an aromatic liquid mixture upon addition of heated water; and a dry shelf stable blend including a grain based product and a dry pet food palatant that form a slurry when mixed with the aromatic liquid mixture.

A further aspect provides a method of preparing a pet food product, comprising: mixing heated water with a highly soluble aromatic composition to form a heated aromatic mixture; adding the heated aromatic mixture to a composition comprising a grain based product and a dry pet food palatant; and mixing the composition comprising a grain based product and a dry pet food palatant and the heated aromatic mixture to form a slurry.

A still further aspect provides a method of preparing a pet food product, comprising: placing a highly soluble aromatic composition in an upper portion of an appliance; placing a container having a composition comprising a grain based product and a dry pet food palatant in a lower portion of said appliance; mixing heated water with said highly soluble aromatic composition in said upper portion to form a heated aromatic liquid mixture; and catching said heated aromatic liquid mixture in said lower portion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment (s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Pets often desire food well above ambient temperatures. However, pet foods served in the home have not, in general, been heated before being served to the pet, nor have they been formulated to respond well to the application of heat or designed for heating in a quick and convenient fashion. The predominant form of pet foods today is a dry (~10% moisture or less) extruded food shaped into small pieces. While these foods are shelf-stable, convenient and nutritious, they are not as palatable as higher moisture foods and can not be quickly and easily heated to improve their appeal.

In contrast to the dry pet foods common today, foods that can be heated rapidly (allowing quick and easy home preparation) are typically high in moisture content. In addition to being a heat transfer medium for the overall food itself, the high moisture content also enables rapid heat transfer to flavor and aroma compounds dissolved or suspended in the aqueous portion of the food, enhancing the rate at which they are released and detected by the pet and pet owner. But high moisture foods are not shelf-stable unless sterilized.

Among the three general methods of sterilization—chemical, radioactive and thermal—the first two are often rejected by consumers and are frequently avoided. Heating is the only method of sterilization generally accepted by consumers for such foods. However, the heating necessary for sterilization is much more extensive than what it takes to simply heat a product to a desirable serving temperature. This extensive heating can cause undesirable changes and/or losses in flavor and aroma. In addition, the long cook times and the even longer time the food spends in a high moisture condition during distribution lead to a loss of the food's initial texture characteristics. This leads to undesirable or non-favorable textural changes within the pet food product.

Moreover, thermally processed, sterilized, high-moisture food has cooled to room temperature long before it is sold, let alone presented to the pet. In addition, high moisture foods are heavy and bulky and, after sterilization, require packaging that is hermetically sealed, impermeable and highly protective.

Thus, while various dry, wet and intermediate moisture pet food formulations are known, it would be desirable to have pet foods that can quickly and easily become warm meals or snacks for pets. Warming of food generally raises the activity levels of flavor and aroma compounds in the food and in general the warmth itself also adds even further appeal. Quick and easy heating using equipment common in a home kitchen is, in general, limited to foods of high moisture content, with water itself being a quick, easy and convenient food component to heat.

An embodiment fulfills this need by providing a product and related methods and apparatuses to generate warm pet foods or snacks directly from a shelf-stable dry product, without the high heat exposure needed for commercial sterilization. In an embodiment, limiting the required heating step to the heating of clean water further advances ease and convenience. In another embodiment, the heating, measuring and dispensing of the water are done automatically for the consumer within a dedicated appliance.

An embodiment thus provides a pet food product that is dry, shelf-stable and allows a pet owner to quickly and easily prepare and present to the pet a warm, highly aromatic and highly palatable meal or snack with the simple addition of heated water. An embodiment may be used as a topping or dressing to be added to or mixed with a conventional dry pet food meal to enhance its appeal to the animal by raising its overall temperature and moisture content and adding additional flavorings and/or nutritional supplements. An embodiment may be used as a warm and highly appealing snack or treat to be served to the pet by itself in order to add variety, interest and/or nutritional supplementation to the pet's overall diet. An embodiment may also be used as a warm, aromatic and highly appealing nutritionally complete food to be provided to the pet as a part of their total diet or as their sole food.

Three core components of an embodiment comprise a dry granular base ("first component"); one or more dry pet food palatants ("second component"); and a dry, rapidly soluble blend containing aromatic compounds and/or further palatants ("third component"). Generally speaking, these core components are configured as follows.

The dry granular base is composed of one or more of the following: whole or processed grains, dried vegetable products, animal or vegetable protein meals, dried stocks/broths, dried fruit products, dried seaweed products, flavor and aroma compounds, dog and cat food palatants, starches, gums, sugars and/or sweeteners, nutritional supplements, salt, spices, and seasonings. The dry pet food palatants contain dried animal digests, natural and/or artificial flavors, other palatants, spices, seasonings and aromatic compounds. The dry pet food palatants are commercially available. The dry, rapidly soluble blend may contain dried stock/broth, aromatic compounds, flavor enhancers, spices and seasonings.

The above-identified components may be combined in any suitable combination, as further described herein. For example, while all three components may be pre-blended together into a single-package pet food product, an embodiment also provides for blending the dry granular base and the dry pet food palatants together, while keeping the dry rapidly soluble blend as a separately packaged part.

As an example method for preparing a pet food product as described herein includes the following. Either (1) a measured amount of a pet food product (as described herein) is blended with a measured amount of water and then the wet blend is heated to the desired temperature using any available heating apparatus; or (2) a measured amount of water is heated to a desired temperature using any available heating apparatus and is then blended with a measured amount of the pet food product described above. In an embodiment, a measured amount of heated water is passed through a holder or chamber containing the dry, rapidly soluble blend, forming a warm aromatic liquid that then pours into and is combined with the pre-blended first and second components (described above) to form the final warm, wet pet food product.

This final warm pet food product, referred to throughout as a "slurry", may be presented on its own to a pet as a snack or as a complete meal, for example as fortified with various nutrients. Moreover, this slurry may be further mixed with conventional dry pet food to form a pleasing meal for the pet, containing the pet's normal dried food, supplemented by the warm slurry as described herein.

In another embodiment, the water needed is both measured and heated in a dedicated appliance that also passes the heated water through a container holding the dry, rapidly soluble blend, creating an aromatic broth/sauce, which then may be added to a dry base to create the slurry. The water may be heated to an appropriate temperature, such as 160 F, in order to ensure aromatics are released when the water is mixed with the rapidly soluble blend. The release of these aromatics should be pleasing to both the pet and the pet owner. This aromatic broth/sauce is automatically dispensed into a waiting container filled with the pre-blended dry granular base (which may include dry pet food palatants). The result of automatically dispensing the heated water/rapidly soluble blend into the dry granular base is to provide a final warm pet food product that is above ambient temperature, for example in the range of 103-105 F, such that it is at a desirably warm temperature for the pet, without being too hot (causing the food to break down in consistency, being too warm for the pet to eat, et cetera). Again, the final warm pet food/slurry product may be served to the pet by itself, or may be further mixed with conventional dry pet food.

Ultimately, at the conclusion of these steps the pet owner has prepared a warm and highly appealing meal or snack for their pet. In an embodiment, the passage of the hot water through the dry, rapidly soluble blend releases aromas that are pleasing to both the pet and the pet owner—before the meal is served, further enhancing the meal experience. And in an embodiment, the need for separate measurement and heating of the water by the pet owner is replaced by automatic steps carried out within a dedicated appliance, freeing the owner to enjoy preparing a warm meal or snack for their pet with maximum ease and convenience.

Single Package Examples

In an embodiment, a dry shelf-stable blend for a heat activated warm pet food product includes components packaged together. For example, in a single package is provided the following: dried stock (for example, chicken, beef or other), oatmeal (for example, thin milled oats), and a palatant (dried animal digest). To prepare the slurry, the dried components are mixed (for example in the home) with a pre-measured (and possibly pre-heated) amount of hot water, forming the slurry. This slurry may be served to the pet on its own, or further combined with other items such as nutritional supplements and/or a conventional dry pet food. The formulation of the dry blend, the weight ratio between the amount of the dry blend and the amount of water, and the temperature to which the water is heated may all be varied to produce finished slurries with a wide variety of textures, flavors and aromas. Example formulations for a single package embodiment are found in Tables I-II. All (%) are weight (%) in Tables I-V.

TABLE I

|  | Example | Ranges |
| --- | --- | --- |
| Single Package Dry Shelf Stable Blend: | | |
| Dried Stock (Chicken, Beef or other) | 6.5% | 0.5%-25.0 |
| Oatmeal, Instant (Thin Milled Oats) | 74.5% | 96.5%-45.0% |
| Palatant (Dried Animal Digest) | 19.0% | 3.0%-30.0% |
| Total: | 100.0% | 100.0% |
| As Prepared: | | |
| Dry Shelf Stable Blend | 31% | 25%-45% |
| Water (Added in the Home) | 69% | 75%-55% |
| Total: | 100% | 100% |

TABLE II

|  | Example | Ranges |
| --- | --- | --- |
| Single Package Dry Shelf Stable Blend: | | |
| Highly Soluble, Aromatic Ingredient | 6.5% | 0.50%-25.00 |
| Grain(s) (Rapidly Hydrating Forms) | 74.5% | 96.5%-45.0% |
| Dry Pet Food Palatant | 19.0% | 3.0%-30.0% |
| Total: | 100.0% | 100.00% |
| As Prepared: | | |
| Dry Shelf Stable Blend | 31% | 25%-45% |
| Water (Added in the Home) | 69% | 75%-55% |
| Total: | 100% | 100% |

TABLE III

| Dry shelf-stable blend | Example | | Ranges |
| --- | --- | --- | --- |
| (A + B): | Component % | Combined % | Component % |
| Component A: | | | |
| Whole or processed grains | 75.2% | 69.2% | 90%-10% |
| Dog or cat food palatants* | 10.0% | 9.2% | 3%-40.0% |
| Animal protein meals | 5.0% | 4.6% | 0%-20% |
| Dried stocks/broth | 2.0% | 1.8% | 0%-15% |
| Nutritional supplements | 2.0% | 1.8% | 0%-15% |
| Dried vegetable products | 2.0% | 1.8% | 0%-15% |
| Dried fruit products | 1.5% | 1.4% | 0%-15% |
| Sugars and/or sweeteners | 1.0% | 0.9% | 0%-10% |
| Dried seaweed products | 0.5% | 0.5% | 0%-5% |
| Flavor and aroma compounds | 0.5% | 0.5% | 0%-5% |
| Starches/gums | 0.3% | 0.2% | 0%-5% |
|  | 100.0% | | |
| Component B: | | | |
| Highly Soluble, Aromatic Ingredient | 70.0% | 5.6% | 100%-20% |
| Other palatants | 20.0% | 1.6% | 0%-40% |
| Sugars and/or sweeteners | 6.0% | 0.5% | 0%-20% |
| Starches/gums | 2.0% | 0.2% | 0%-10% |
| Flavor and aroma compounds | 2.0% | 0.2% | 0%-10% |
|  | 100.0% | 100.0% | |
| As Prepared: | | | |
| Component A | 29.0% | | 24.9%-34.0% |
| Component B | 2.0% | | 0.1%-11.0% |
| Water | 69.0% | | 75.0%-55.0% |
| Total: | 100.0% | | 100.0% |

In a more complex formulation of a single package embodiment, two components (A and B) are provided, packaged together. Component A contains one or more of the following: whole or processed grains, dried vegetable products, animal protein meals, dried stocks/broths, dried fruit products, dried seaweed products, flavor and aroma compounds, pet (for example, dog and/or cat) food palatants (for example including but not limited to dried animal digests, natural and/or artificial flavors, other palatants, spices, seasonings and aromatic compounds), starches, gums, dried stock/broth, sugars and/or sweeteners, nutritional supplements, salt, spices, and seasonings, or some suitable combination of the foregoing.

Component B includes one or more of the following: highly soluble, aromatic ingredients, palatants, sugars and/or sweeteners, starches, gums, flavor and aroma compounds, or some suitable combination of the foregoing.

In a single package embodiment, components A and B are packaged together as the dry blend and this dry blend is mixed (for example in the home) with a pre-measured (and possibly pre-heated) amount of hot water, forming a (warm) slurry. Again, this slurry may be served to the pet on its own, or further combined with other items such as nutritional supplements and/or a conventional dry pet food. The formulation of the dry blend, the weight ratio between the amount of the dry blend and the amount of water, and the temperature to which the water is heated may all be varied to produce finished slurries with a wide variety of textures, flavors and aromas. An example formulation is given in Table III.

Dual Package Examples

An embodiment provides a dual-package format in which a shelf-stable dry blend is provided in two separate packages, as follows. Component A is packaged separately as a mix containing, at a minimum, grains or grain products such as oatmeal and a pet food palatant (dried animal digest). Component A may also contain some or all of the components listed in Table III for component A. Component B is packaged separately as a mix that may contain any of the dry materials listed for component A that are soluble in water (for example, those that solubilize rapidly in water heated to approximately 160 F, such as dried broth, sugars and/or aromatic compounds).

In a dual-package embodiment, component B is mixed with the heated water first, forming a highly aromatic broth or sauce that is then mixed with component A to form the finished warm pet food (slurry). Again, preferably the water is heated (for example to 160 F or above) so that aromatics are released when the heated water is mixed with component B, but the final temperature of the slurry is not too hot, for example in the range of 103-105 F. This two-step preparation may be easily carried out in the home and allows for the release of aromas that are pleasing to both the pet and pet owner, enhancing both the preparation experience and the appeal of the warm pet food to the pet. Again, this slurry may be served to the pet on its own, or further combined with other items such as nutritional supplements and/or a conventional dry pet food. An example of a dual-component formulation is given in Table IV.

TABLE IV

| Dual Package | Example | | Ranges |
|---|---|---|---|
| | Component % | Combined % | Component % |
| Package 1 Component A: | | | |
| Oatmeal, Instant (Thin Milled Oats) | 79.7% | 74.5% | 97%-60% |
| Dried Animal Digest | 20.3% | 19.0% | 3%-40% |
| Total: | 100.0% | | 100% |
| Package 2 Component B: | | | |
| Dried Stock (Chicken, Beef or other) | 100.0% | 6.5% | 100% |
| Total: | 100.0% | 100.0% | 100% |
| As Prepared: | | | |
| Component A | | 29.0% | 24.9%-34.0% |
| Component B | | 2.0% | 0.1%-11.0% |
| Water (Added to B) | | 69.0% | 75.0%-55.0% |
| Total: | | 100.0% | 100.0% |

Another example of a dual-component formulation is given in Table V. Here it is to be understood that any grains that are rapidly hydrating may be used in component A along with an appropriate pet food palatant, for example dog and/or cat palatants. Again, component B is mixed with the heated water first, forming a highly aromatic broth or sauce that is then mixed with component A to form the finished warm pet food (slurry).

TABLE V

| Dual Package | Example | | Ranges |
|---|---|---|---|
| | Component % | Combined % | Component % |
| Package 1 Component A: | | | |
| Grain(s) (Rapidly Hydrating Forms) | 79.7% | 74.5% | 97%-60% |
| Dry Pet Food Palatant | 20.3% | 19.0% | 3%-40% |
| Total: | 100.0% | | 100% |
| Package 2 Component B: | | | |
| Highly Soluble, Aromatic Ingredient | 100.0% | 6.5% | 100% |
| Total: | 100.0% | 100.0% | 100% |
| As Prepared: | | | |
| Component A | | 29.0% | 24.9%-34.0% |
| Component B | | 2.0% | 0.1%-11.0% |
| Water (Added to B) | | 69.0% | 75.0%-55.0% |
| Total: | | 100.0% | 100.0% |

Figure 1:
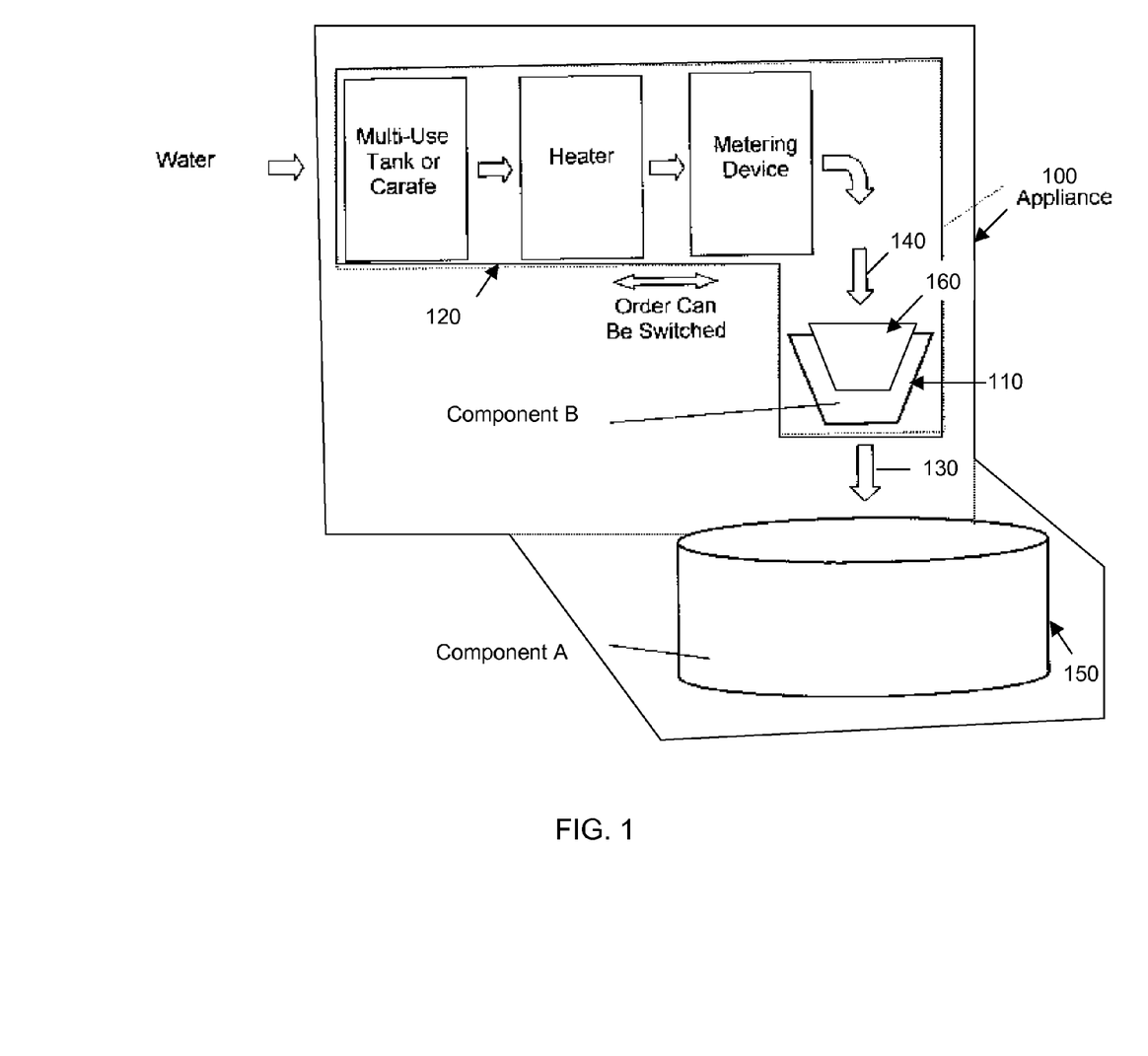
FIG. 1 illustrates an example device for preparing heat activated warm pet food.

Referring to FIG. 1, an embodiment provides a holder/dispenser appliance 100 for use with a dual-package format. For the dual-package format, a funnel-like piece 110 may be provided at a top portion 120 of said appliance. This funnel-like piece 110 may be used to aid in the formation of the aromatic broth/sauce 130 formed via mixture of component B, as contained in the funnel-like piece 110, and heated water 140.

The funnel-like piece 110 may accommodate a removable piece or cup that is prepackaged with a predetermined amount of component B. For example, the funnel-like piece 110 may accommodate an individual package 160 that is prepared with a given composition of component B. An example may be a package 160 including a chamber, component B stored in the chamber, and a covering enclosing the chamber. The covering may be piercable by a component of a dedicated appliance 100, such as a water inlet, to accommodate an inflow of heated water into said chamber for mixing with component B to produce a heated aromatic mixture. The covering may be further piercable by another component of the dedicated appliance, such as an outlet, to accommodate an outflow of the heated aromatic mixture exterior to the package 160 and onto component A below, thus forming the slurry. It should be noted that slurry may be mixed such that component A and heated aromatic mixture (component B and heated water) may be thoroughly combined.

Thus, one funnel-like piece 110 may accommodate packages including a formulation particularly desirable for cats, whereas another may include a formulation particularly desirable for dogs, et cetera. It should also be noted that although funnel-like piece 110 and package 160 are shown and described as particular shapes, each might take on different shapes.

The appliance 100 may include upper portion 120 to fit over any typical pet food mixing/serving bowl 150 containing component A. Thus, as water is heated, measure and provided to funnel-like component 110, component B is formed into an aromatic broth 130 that is deposited on component A. As described herein, once mixed, the slurry thus formed may be further mixed with other materials, such as pieces of dried fruit, conventional dry pet food, et cetera.

Figure 2:
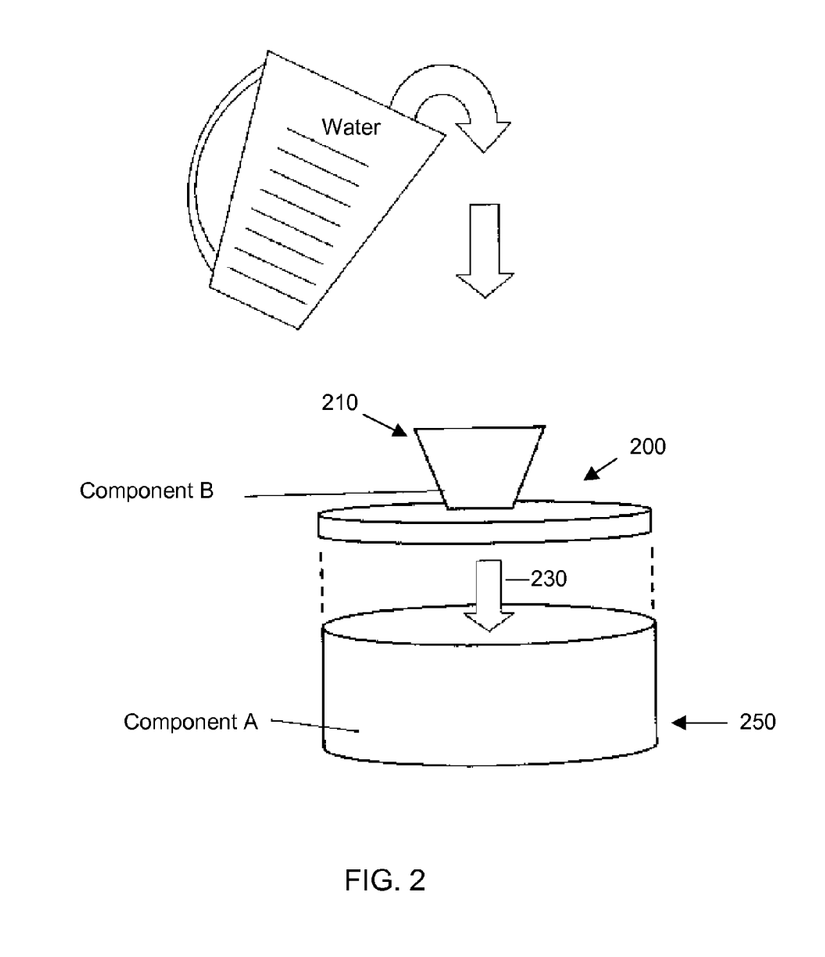
FIG. 2 illustrates an example device for preparing heat activated warm pet food.

Referring to FIG. 2, as another example, the appliance 200 may be specifically designed to fit onto or be included as a part of the container lid for single-serving packages of component A contained in a bowl/container 250. A measured amount of component B would be added to the chamber 210 and then the pre-measured pre-heated water would be poured through the chamber 210, creating the aromatic broth/sauce 230, which would then flow into the bowl/container 250 below, containing component A.

Component B may be emptied into the chamber 210 prior to pouring in the pre-heated water. Alternatively, the chamber 210 could allow pre-filled single-serving packets or containers of component B to be directly inserted into the chamber 210. The packets or containers may be equipped with a means of allowing entry of the hot water and exit of the hot broth/sauce (or alternatively the chamber 210 may open or pierce the packets/containers to allow such entry and exit).

The shelf-stable dry blend may be packaged in a bulk container or in disposable individual packets containing a pre-measured amount suitable for a single-serving presentation, for example to dogs or cats. Single-serving amounts may be offered in different sizes appropriate for a particular size range of the dogs or the cats. Alternatively, single-serving amounts may be packaged in containers intended to serve as mixing and/or serving bowls in the home or during travel. In the case of the dual-package format described herein, components A and B may be packaged separately, in either bulk single-serving formats or single-serving amounts.

Figure 3:
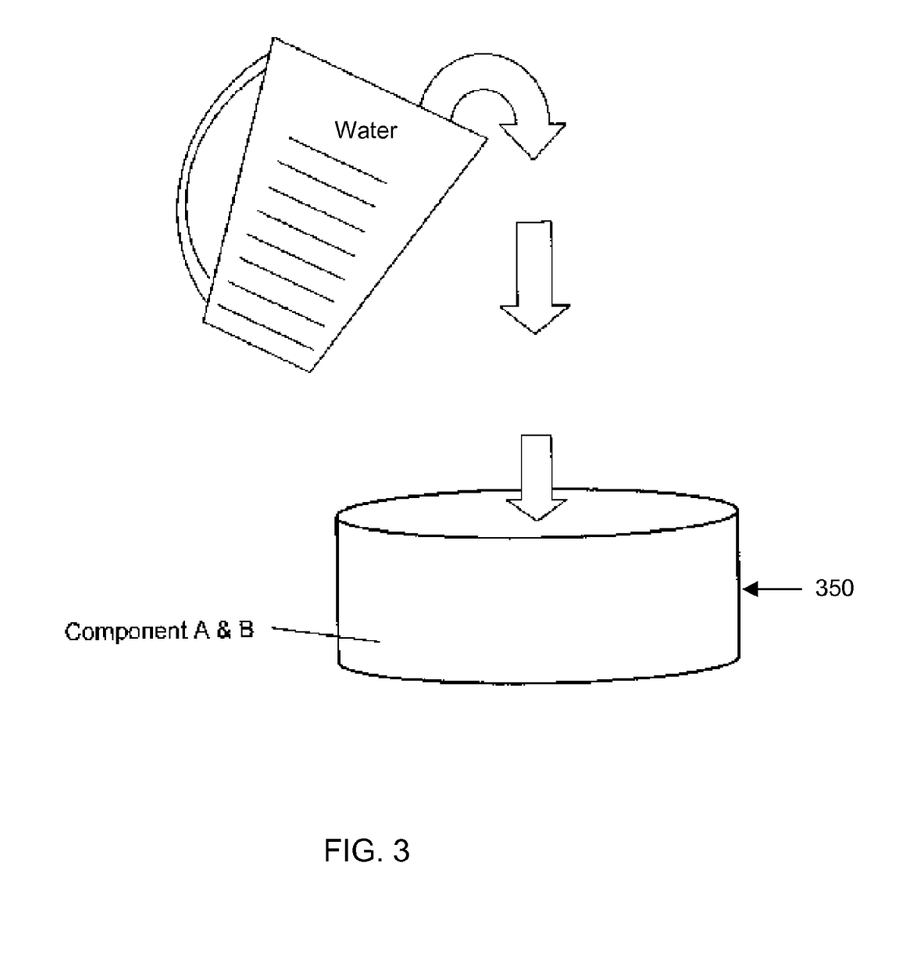
FIG. 3 illustrates an example device for preparing heat activated warm pet food.

As illustrated in FIG. 3, for home preparation of a warm pet food according to an embodiment, a user may simply heat water to a desired temperature, measure out appropriate quantities of the heated water and apply it to a single package of the shelf-stable dry blend (containing both components A and B), and mix these to form the warm slurry in a container 350. The measurement of the shelf-stable dry blend may be done by a manufacturer, but the consumer would still measure and heat the water, unless the user is employing a dedicated appliance that automatically measures the water, heats it, and provides it to a separate package, as described herein.

Additionally, for a single package format, an optional method is to use a dedicated appliance to automatically measure and heat the water, and dispense the heated water into a mixing/serving bowl containing the pre-measured shelf-stable dry blend. Such an appliance allows the user to select both the amount of hot water to be dispensed and the water temperature when dispensed. This in turn allows for the preparation of different quantities of warm pet food suitable for different sizes of dogs or cats, and also suitable for the temperature preferences of the pet or the pet owner.

For a dual-package format, likewise an optional appliance may be used, As illustrated in FIG. 1, such an appliance may include a built-in holder/dispenser for individual single serving packets of component B. Single serving packets of component A may also be provided. Combining the use of such an appliance with the use of pre-measured single-serving packets, for example of both components A and B, provides an extremely quick, easy and flexible method of preparing highly appealing and uniquely textured warm pet foods in the home.

Embodiments provide a variety of flavor variations. The shelf-stable dry blend may be made with a variety of flavor sources. In the case of a dual-package format, flavoring and aromatic ingredients could be varied in both components, creating the opportunity for the pet owner to create complimentary and/or complex flavor combinations during the home preparation of the warm pet food.

Embodiments provide a variety of nutritional supplementation. While the basic shelf-stable dry blend could be made and used without additional nutritional supplementation, selected supplements could be added to provide specific nutritional support for dietary or health issues of concern to pet owners. In addition, the shelf-stable dry blend (or component A in the dual package version) could be formulated to provide complete nutrition for the dog or cat.

Other optional components and ingredients are as follows. Additional dry ingredients could be added to alter the texture, flavor, aroma or appearance of the finished warm pet food slurry, as described herein. These include, but are not limited to spices, herbs, sweeteners, food colors, emulsifiers and other functional ingredients, and suitable combinations of the foregoing. In addition, discrete pieces of dehydrated foods (meats, fruits, vegetables, et cetera, which would re-hydrate upon the addition of the hot water) could be included. Fats and oils and associated antioxidants and/or encapsulating materials could also be incorporated as long as care is taken to maintain the shelf-stable nature of the product.

One example embodiment provides a product including the following: component A, a dry shelf-stable mixture containing one or more of the following: whole and/or processed grains, dried vegetable products, animal protein meals, dried stocks/broth, dried fruit products, dried seaweed products, flavor and aroma compounds, dog or cat food palatants, starches, gums, sugars, salt, spices, herbs, sweeteners, food colors, emulsifiers, other functional ingredients, discrete pieces of dehydrated foods (meats, fruits, vegetables, et cetera), nutritional supplements and fats/oils with associated antioxidants and/or encapsulating materials; and component B, a dry shelf-stable blend that is rapidly soluble in hot water containing one or more of the following: a dried broth or stock, other flavor ingredients, sugars or other sweeteners, starches, gums and aromatic compounds; and a dedicated appliance used to measure and quickly heat water and dispense the hot water through a holder containing the appropriate amount of component B with the discharge of the resulting hot broth/sauce flowing into a holder or bowl containing the appropriate amount of component A. Components A and B may then be mixed together to form a slurry, which in turn may be mixed with further materials.

Components A and B may be provided in either separate single-serving containers intended be used in tandem (one container of component A with one container of component B) or may be provided in separate bulk packages with instructions as to the appropriate amounts to use together.

Differently sized single-serving packages of both component A and component B or instructions showing different use amounts of the two bulk-packaged blends could be provided to assure that the quantity of warm pet food that is prepared is appropriate for different size classes of dogs or cats.

An appliance according to an embodiment is designed to allow the consumer to select different amounts of water to be measured, heated and dispensed. The amounts of water are suitable for combination with the differently sized single-serving containers or the different amounts of component A and B that the pet owner is directed to use for the size class of their pet. Moreover, the appliance may be programmed to automatically select the appropriate amount of water for a given indication. For example, the appliance may provide short hand selections for selecting one of a variety of predetermined amounts of water (for example, small dog selection, medium size dog selection, large dog selection, et cetera). The appliance could also be designed to allow the consumer to select among two or more temperatures for the water to be heated to, depending on the preferences of the pet owner and/or pet. Since the appliance may only heat enough water for the single serving being prepared, the water would be heated quickly, requiring at most only a few minutes when starting from ambient temperature water.

Figure 4:
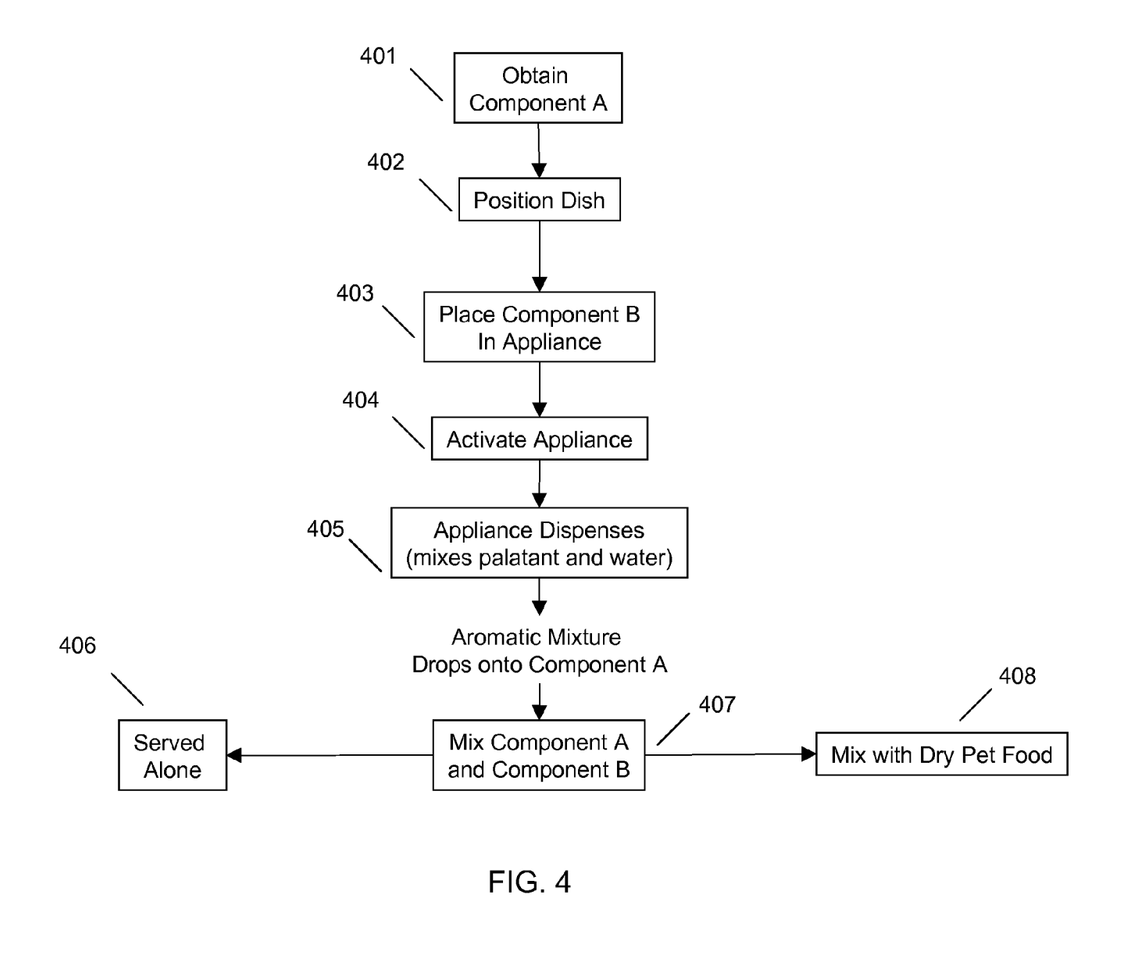
FIG. 4 illustrates an example method for preparing heat activated warm pet food.

Referring to FIG. 4, to prepare the warm pet food, the pet owner(s) (user(s)) would perform the following. A user would first obtain component A 401. A user might obtain component A in a variety of ways. For example, a user may measure a quantity of component A into a convenient mixing/serving dish. Alternatively, a user may empty a pre-measured single-serving packet/container of component A into a mixing/serving dish. Alternatively, a user may open a pre-measured single-serving container that is used as the mixing/serving dish.

Next, a user places the mixing/serving dish under the dispensing spout of the appliance 402. A user may then either place a quantity of dry component B (or package containing a pre-measured amount) into the component B holder in the appliance 403. Again, a user may measure out an amount of component B according to package directions or empty a pre-measured single-serving packet/container of component B into the appliance's holder, or place the pre-measured single-serving packet or cup of component B directly into the appliance's holder. A user then selects the desired quantity and temperature of hot water to be dispensed and activates the appliance 404. A dedicated appliance may meter out a predetermined amount of water, heat it (for example to above 160 F), and then dispense the heated water 405.

Next, an aromatic mixture (component B mixed with heated water) drops onto component A in the dish below. The user may then mix the aromatic mixture and component A to form the warm slurry 406. This warm slurry may be served to the pet directly 407, or it may be further mixed with other materials, such as dry pet food 408. It should be understood that the above steps might be performed in any suitable order.

As described herein, this warm pet food can be formulated for and/or used in one of several formats. It may be used as a topper to be poured onto (and mixed with, if desired) conventional dry pet food to enhance the warmth, flavor, aroma (and nutritional profile, if so formulated) of the pet's meal. It may be fed directly as a warm and highly palatable snack to enhance the variety and flavor (and nutritional content, if so formulated) of the pet's overall diet. It may also be fed directly as a warm and highly palatable nutritionally complete meal (when formulated to be nutritionally complete) as either a part of the pet's overall diet or as the pet's sole food.

Accordingly, an embodiment combines the benefits of adding heat to a pet food and the convenience of quick heating that is possible with a high moisture content while avoiding the negative impact on texture, flavor and nutrition associated with the high temperature processing necessary for shelf-stable high moisture food pet foods. This is accomplished by a product of relatively low in moisture as sold, but to accommodate and react to the addition of water and heat during home preparation. This allows the pet food to be given to the pet within moments after water has been added and the temperature of the food has been elevated to the desired range.

The hydration of the food solubilizes flavors and aromas; the heating of the food elevates the activity level of those flavor and aroma compounds and also releases them into the atmosphere more effectively so that the food becomes more attractive to both the pet and the pet owner. The short time between hydration, heating and presentation to the pet allows the food to be served at a warm temperature and to retain short-term or intermediate textures that are difficult or impossible to retain in a commercially sterilized high moisture food.

The warm pet food described herein provides an enhanced eating experience for the pet while at the same time giving the pet owner the opportunity to participate in the preparation of the pet's meal in a quick, easy and convenient manner.

Highly aromatic compounds that are released upon exposure to hot water can be included in either a single or dual component embodiments. However, these may lose all functionality when exposed to the high processing temperatures typical of the extrusion, baking or drying steps common in commercial dry pet foods. The thick, clinging texture of the wet slurries possible with embodiments provide an opportunity to heat the individual pieces of dry pet food while retaining their basic hard crunchy texture for much of the normal duration of a pet meal. This provides an effect difficult to duplicate with simple hot water.

An embodiment provides a unique and structurally different form of pet food compared with other known devices or solutions. More specifically, an embodiment provides highly aromatic compounds that are solubilized by the addition of water and released into the atmosphere to be sensed by the pet prior to consumption due to the elevation in temperature resulting from the use of heated water. Highly flavorful materials that release flavor compounds into the aqueous portion of the product upon addition of water and which are raised to higher levels of activity due to the elevation in temperature result from the use of heated water. Wet slurry-like textures result from an appropriate choice of dry ingredients and an appropriate designation of the weight or volume of heated water to use per weight of dry product. An appropriate range of finished product temperatures is dictated by indicated desired hot water temperatures and/or by designated heating conditions for the hot water and/or by control of possible choices for water temperature in a dedicated appliance (if used). Such temperatures are selected on the basis of use format, mixing with dry pet food with the intent of raising temperature and moisture, or use as a stand-alone treat or nutritionally complete pet food.

Furthermore, the process associated with the warm pet food is likewise unique and different from known processes and solutions. More specifically, an embodiment provides a process for a quick and convenient creation of a warm pet food, with release of aromatic and flavor compounds during preparation so that appeal to both the pet owner and the pet are enhanced. An embodiment provides a method for preparing warm pet foods with a thick yet pour-able texture, suitable for mixing with commercial dry pet foods. An embodiment is effective in providing a heat transfer to the individual pieces of those foods while minimizing the short-term transfer of moisture and subsequent loss of texture that occurs when dry pet foods are directly mixed with water. An embodiment thus provides warm and high-moisture pet foods without the need for the commercial sterilization necessary when pet foods are manufactured and sold in a high-moisture condition. An embodiment also provides a quick and convenient method for preparing warm pet foods without the need for extensive in-home heating of a dry pet food or the use of appliances used in the home for the preparation of human foods (microwave ovens, conventional ovens, stovetop heating, et cetera).

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A pet food enhancer comprising: a single serving packaging to which water may be added; the single serving packaging containing therein a dry, shelf-stable blend comprising 0.5-25% weight of at least one soluble aromatic composition, 45-96.5% weight of at least one dry granular base, and 3-30% weight of at least one dry, pet food palatant; wherein the at least one dry granular base consists of oatmeal; wherein the at least one dry, pet food palatant comprises dried animal digest; and wherein the dry, shelf-stable blend does not include dry pet food kibble.

2. The pet food enhancer of claim 1, wherein the at least one soluble aromatic composition comprises dried animal stock.

3. The pet food enhancer of claim 1, wherein the at least one dry granular base comprises 60-96.5% weight of the dry, shelf-stable blend.

4. The pet food enhancer of claim 1, further comprising at least one other dry, granular base is selected from the group consisting of: whole or processed grain, animal protein meal, dried stock, nutritional supplement, dried vegetable product, dried fruit product, sugar, dried seaweed product, starch, gum, flavor enhancing compound, and aroma enhancing compound.

5. The pet food enhancer of claim 1, further comprising additional packaging, comprising dry pet food having a moisture content of approximately 10%;
   wherein the dry pet food is separate from the dry, shelf-stable blend.

6. A pet food enhancer comprising: a single serving packaging to which water may be added; the single serving packaging containing therein: a packaged dry, shelf-stable blend comprising a soluble aromatic composition that forms an aromatic liquid mixture upon addition of water heated to a temperature which is above room temperature; and a separately packaged dry, shelf-stable blend that comprises 45-96.5% weight of at least one dry granular base and 3-30% weight of at least one dry, pet food palatant; wherein the at least one dry granular base consists of oatmeal; and wherein the at least one dry, pet food palatant comprises dried animal digest.

7. The pet food enhancer of claim 6, further comprising additional packaging, comprising dry pet food having a moisture content of approximately 10%,
    wherein the dry pet food is separate from the dry, shelf-stable blend.

8. The pet food enhancer of claim 6, further comprising at least one other dry, granular base selected from the group consisting of: whole or processed grain, animal protein meal, dried stock, nutritional supplement, dried vegetable product, dried fruit product, sugar, dried seaweed product, starch, gum, flavor enhancing compound, and aroma enhancing compound.

\* \* \* \* \*